US012597257B2

(12) United States Patent
Taalas et al.

(10) Patent No.: US 12,597,257 B2
(45) Date of Patent: Apr. 7, 2026

(54) MONITORING SYSTEM AND METHOD FOR RECOGNIZING THE ACTIVITY OF DETERMINED PERSONS

(71) Applicant: Verso Vision Oy, Jyväskylä (FI)

(72) Inventors: Katja Taalas, Jyväskylä (FI); Lauri Laaksonen, Lappeenranta (FI); Lauri Faloon, Lappeenranta (FI); Toni Kuparinen, Lappeenranta (FI); Sinan Kaplan, Lappeenranta (FI)

(73) Assignee: Verso Vision Oy, Jyväskylä (FI)

( * ) Notice: Subject to any disclaimer, the term of this patent is extended or adjusted under 35 U.S.C. 154(b) by 54 days.

(21) Appl. No.: 18/558,629

(22) PCT Filed: May 4, 2022

(86) PCT No.: PCT/FI2022/050295
§ 371 (c)(1),
(2) Date: Nov. 2, 2023

(87) PCT Pub. No.: WO2022/234191
PCT Pub. Date: Nov. 10, 2022

(65) Prior Publication Data
US 2024/0221382 A1 Jul. 4, 2024

(30) Foreign Application Priority Data

May 7, 2021 (FI) ...................................... 20215542

(51) Int. Cl.
*G06V 20/50* (2022.01)
*G06T 7/20* (2017.01)
(Continued)

(52) U.S. Cl.
CPC ................ *G06V 20/52* (2022.01); *G06T 7/20* (2013.01); *G06V 20/70* (2022.01); *G06V 40/20* (2022.01);
(Continued)

(58) Field of Classification Search
CPC ........ G06V 20/52; G06V 20/70; G06V 40/20; G06T 7/20; G08B 21/043; G08B 21/0476
(Continued)

(56) References Cited

U.S. PATENT DOCUMENTS 9,524,443 B1 * 12/2016 Kusens ................ G06V 10/143
2016/0371950 A1 12/2016 Yasukawa
(Continued)

FOREIGN PATENT DOCUMENTS

CN 111292504 A 6/2020
CN 110778265 B 11/2020
(Continued)

OTHER PUBLICATIONS

Finnish Patent Office, Office Action, Application No. 20215542, mailed Nov. 4, 2021, 6 pages.
(Continued)

*Primary Examiner* — Daquan Zhao
(74) *Attorney, Agent, or Firm* — Ziegler IP Law Group, LLC.

(57) ABSTRACT

A monitoring method of at least one person in a space includes receiving image data of the space, detecting at least one person from the image data, and determining the at least one detected person as a person to be monitored if it is detected from the image data that the at least one detected person fulfils at least one predetermined person to be monitored conditions. The present disclosure also relates to monitoring system for monitoring at least one person in a space and a computer program product performing the monitoring method.

9 Claims, 3 Drawing Sheets

(51) Int. Cl.

| | |
|---|---|
| *G06V 20/52* | (2022.01) |
| *G06V 20/70* | (2022.01) |
| *G06V 40/20* | (2022.01) |
| *G08B 21/04* | (2006.01) |

(52) U.S. Cl.
CPC ....... *G08B 21/043* (2013.01); *G08B 21/0476* (2013.01); *G06V 2201/07* (2022.01)

(58) Field of Classification Search
USPC ................... 348/208.14, 207.99, 61, 77, 169
See application file for complete search history.

(56) References Cited

U.S. PATENT DOCUMENTS

| | | | |
|---|---|---|---|
| 2019/0043192 A1 | 2/2019 | Kusens et al. | |
| 2019/0138330 A1* | 5/2019 | Wu ................... | G06F 16/90332 |
| 2019/0304284 A1 | 10/2019 | Takeuchi et al. | |
| 2019/0313948 A1 | 10/2019 | Matsunaga et al. | |
| 2020/0050844 A1 | 2/2020 | Kusens | |
| 2020/0205697 A1 | 7/2020 | Zheng et al. | |
| 2020/0349347 A1 | 11/2020 | Morzhakov | |

FOREIGN PATENT DOCUMENTS

| | | | |
|---|---|---|---|
| EP | 3706035 | A1 | 9/2020 |
| GB | 2581767 | A | 9/2020 |
| JP | 2004065471 | A | 3/2004 |
| JP | 2011005171 | A | 1/2011 |
| JP | 2017076304 | A | 4/2017 |
| JP | 2017173877 | A | 9/2017 |
| JP | 2018124604 | A | 8/2018 |
| JP | 2018139388 | A | 9/2018 |
| JP | 2019021002 | A | 2/2019 |
| JP | 2019110474 | A | 7/2019 |
| JP | 2019176423 | A | 10/2019 |
| JP | 2020091628 | A | 6/2020 |
| KR | 20200121067 | A | 10/2020 |
| KR | 20210041464 | A | 4/2021 |
| WO | 2010055205 | A1 | 5/2010 |
| WO | 2015011591 | A1 | 1/2015 |
| WO | 2016194402 | A1 | 12/2016 |
| WO | 2020241034 | A1 | 12/2020 |

OTHER PUBLICATIONS

Finnish Patent Office, International Search Report, Application No. PCT/FI2022/050295, mailed Aug. 3, 2022, 3 pages.

European Patent Office, Extended European Search Report, Application No. 22798707.0, mailed Oct. 8, 2024, 10 pages.

Japan Patent Office, Office Action, Application No. 2023-568531, dated Dec. 10, 2024, 5 pages, English Translation 4 pages.

Japan Patent Office, Second Office Action, Application No. 2023-568531, Mailed Apr. 15, 2025, 5 pages.

Korean Intellectual Property Office, Office Action, Application No. 102023 7037659, Mailed Sep. 16, 2025, 7 pages.

\* cited by examiner

33

Computing
device

Computing
device

MONITORING SYSTEM AND METHOD FOR RECOGNIZING THE ACTIVITY OF DETERMINED PERSONS

FIELD

The aspects of the disclosed embodiments relate to a method for monitoring at least one person in a space, and a system and a computer program product for performing the method.

BACKGROUND

Persons, such as patients or eldered people, are sometimes camera monitored in hospitals, nursing homes, or service houses in order to better ensure their safety in situations where the medical staff cannot be present at all times.

By camera monitoring, a single health care worker or other supervisor can monitor persons and/or the activity of the persons in several rooms at the same time, and possibly prevent a patient from leaving a room unauthorized or incidents from happening to a patient, so that a better safety level of living is achieved. By automatic camera monitoring, it is possible to make automatic alarms for health care workers of undesired situations, for example, falling of a person or unauthorized leaving from the room etc., detected from image data.

However, it is possible that there are no such financial resources that all rooms of, for example, a hospital can be monitored by a supervisor all the time, or that there are too many rooms to be monitored per a supervisor and all undesired situations cannot therefore be seen. Furthermore, it is also possible that due to privacy reasons, a full-time monitoring performed by a person is not possible or desirable solution. In these cases automatic camera monitoring is a solution, but in many times, it detects or analyses situations wrong from image data, and unnecessary alarms are made, which causes unnecessary work, costs, or dangerous situations when it is necessary for a medical worker to detach from an ongoing work situation and go to the alarm site having no alarming situation.

BRIEF SUMMARY

It is the aim of the aspects of the disclosed embodiments to provide and present a novel system, computer implemented method, and a computer program product for monitoring determined persons. The monitoring system, method, a computer program product according to the invention are characterized in what will be presented in the independent claims, and the dependent claims relate to advantageous embodiments of the present disclosure.

According to a first example embodiment, the present disclosure relates to monitoring method of at least one person in a space. The method comprises receiving image data of the space, detecting at least one person (15) from the image data, and determining the at least one detected person (15) as a person to be monitored if it is detected from the image data that the at least one detected person (15) fulfils at least one predetermined person to be monitored conditions.

In an example embodiment, the at least one predetermined person to be monitored conditions comprises at least one of the following: a person has stayed on a bed for a first predetermined time period, a person has stayed in a predetermined area for a second predetermined time period, or a person has stayed alone in the space for a third predetermined time period. In an example embodiment, determining the person as a person to be monitored comprises:

generating a label for the detected person, and setting a person to be monitored status for the label. In an example embodiment, the method further comprises tracking the person to be monitored from the image data, and recognizing an activity of the person to be monitored. In an example embodiment, the recognizing comprises using Artificial Intelligence (AI) model or models for recognizing activity of the person to be monitored. In an example embodiment, the method further comprises comparing the recognized activity of the person to be monitored to at least one activity attached to an alarm profile determined for the person to be monitored, and triggering an alarm if the detected event comprises an activity attached to the alarm profile. In an example embodiment, the activity attached to the alarm profile is laying or sitting on a floor, leaving from the space or moving in a bed, or leaving the bed. In an example embodiment, the method further comprises blocking the alarm if another person is detected in the space.

According to a second example embodiment, the present disclosure relates to a monitoring system for monitoring at least one person in a space. The system comprises: at least one camera and a computing device configured to perform the method according to a first example embodiment and its example embodiments.

According to a third example embodiment, the present disclosure relates to a computer program product, stored on a computer readable medium and executable in a computing device, wherein the computer program product comprises instructions to perform the method according to a first example embodiment and its example embodiments.

DESCRIPTION OF THE DRAWINGS

In the following, the present disclosure will be described in more detail with reference to the appended drawings, in which

FIG. 3 shows a view of a situation of a patient falling detected by a monitoring system according to an example embodiment;

FIG. 4 shows a view of a situation of a patient leaving a hospital room unauthorized detected by a monitoring system according to an example embodiment.

DETAILED DESCRIPTION

Figures 1, 2:
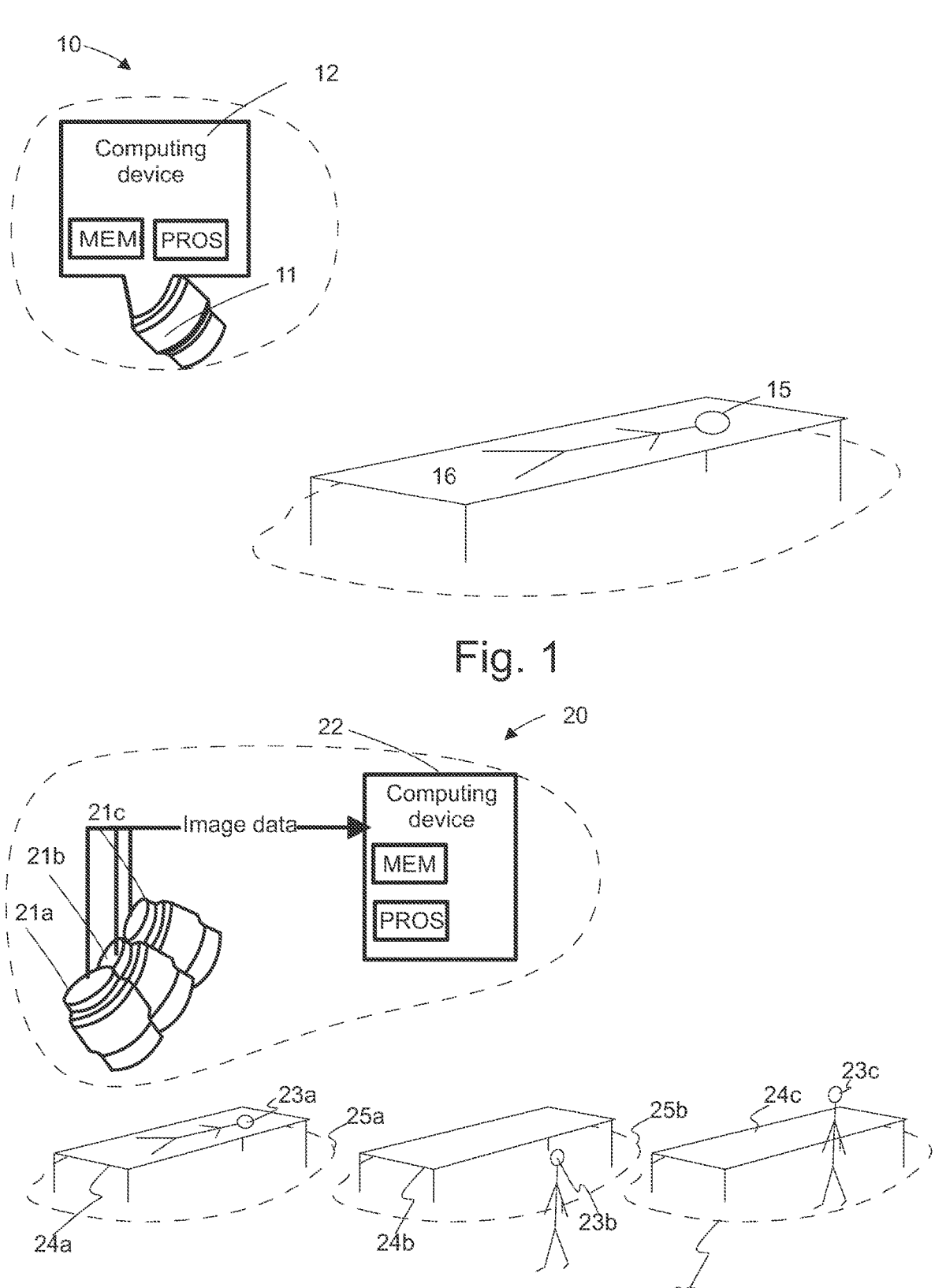
FIG. 1 shows a view of a monitoring system according to an example embodiment, for detecting and determining a person in a room for a patient, and recognizing activities of the patient in the room.
FIG. 2 shows a view of a monitoring system according to an example embodiment, for detecting one or more persons in a room for one or more patients, and recognizing activities of the one or more patients in the room.

There are situations, where persons need to be monitored in their hospital rooms, bedrooms or apartments in order to better ensure their safety in situations when their own physical or emotional condition is such that their own coping in everyday situations, for example, when rising from a bed or leaving a room, is not always secure or desired. Camera monitoring is an advantageous option for person monitoring, especially when the monitoring is automatic i.e. computing devices perform the needed monitoring activities, for example, detect and track persons, and recognize activities of persons and further send alarms to personnel, for example, in a case of a danger, undesired situation, or when a possible emergency threatens. Camera monitoring may be performed by a camera. The camera may be any means capturing images, video, poses, and/or depth information for analysis. As used herein, an image includes a still image as well as an image from a video recording and in this context the term "camera" refers to any image capturing element suitable for capturing image data for the camera monitoring system of the present disclosure. For example, in an example embodiment, the camera may be a color camera, or black and white camera with or without infrared (IR) illumination, a near Infrared camera, a 360 degree camera, an IR camera, or a depth camera.

Thus, by camera monitoring of the present disclosure performed by a camera monitoring system comprising at least one camera and computing device, persons and/or activities of the persons can be continuously monitored and analysed. Camera or cameras capture image data, for example, frequently captured stationary images, video images, poses, or depth information, computing devices that are a part of the camera or cameras, external computing devices, or a cloud service or services may receive the image data, and perform image analyses. The image analyses comprises at least detecting a person in a monitored space, for example, in a room, and determining the person as a person to be monitored i.e. for example, as a patient (explained more detailed below) when conditions are fulfilled, but the analysis may further comprise tracking the person to be monitored and recognising her/his activity or activities. Recognising activities may be done by using any existing Artificial Intelligence (AI) model or models and method or methods, or any other suitable image analysing methods. Recognized activities i.e. events of the person to be monitored may be for example, certain situations, moves, falling, leaving, postures and/or gestures, detected from the image data by computing devices performing image analysing. Then these activities are compared to at least one activity attached to an alarm profile determined for the person to be monitored. The alarm profile may comprise a selection of activities i.e. activities attached to the alarm profile. The attaching of an activity to the alarm profile may be performed, for example, by tapping an activity on in a list of activities. The alarm profile defines whether a certain activity causes an alarm or not, if the certain activity is attached to the alarm profile and the same activity is recognized from image data, an alarm is caused i.e. triggered i.e. sent to a personnel. The alarm may be sent, for example, to a nurse call system, mobile phone, or to any other device or means suitable for alarming when receiving an alarm signal from a computing device. In order to detect alarming situations of persons to be monitored from image data more carefully and avoiding false or unnecessary alarms, persons to be monitored, for example, patients, and their alarm profiles are in the present disclosure determined for a monitoring system in advance before the monitoring and analysing of activities of the monitored person is actually started.

Determining i.e. classifying a person as a "person to be monitored" for a monitoring system may be done, for example, as follows: A person is detected from received image data of a room of a hospital or in any other monitored room or space. A person label is generated for the detected person. When the person fulfils predetermined conditions of a person to be monitored a "person to be monitored status" may be set for the person label, then the person has a person to be monitored label. When the detected person is determined not to be a person to be monitored i.e. the person does not fulfil predetermined conditions of a person to be monitored, the set status of a label may depend on, for example, a job of a person etc. in which case the set status may be, for example, a "cleaning person (cleaner)", a "doctor", "nurse", "visitor" etc. or the set status may be just a person status or it has no status, which differentiates these persons from persons to be monitored. Examples of a person to be monitored are, for example, patients and residents of the monitored room or space. Thus, a person with "patient status" or "resident status" corresponds a person with a "person to be monitored status" and she/he is configured to be monitored by at least one camera, and her/his activities in a room are configured to be analysed from the image data provided by the camera. Analysing of activities may comprise at least recognizing activities of the patient.

The determining of a "person to be monitored status" for a person i.e. setting a status of a person to be monitored for a generated person label of the detected person in the room, may be done if the person fulfils at least one predetermined person to be monitored conditions. The at least one predetermined person to be monitored conditions may comprise at least one of the following: a person has stayed on a bed for a first predetermined time period, or a person has stayed in a predetermined area for a second predetermined time period, or a person has stayed alone in the space for a third predetermined time period. In the first condition example, a person is determined to have a person to be monitored status, when she/he has been lying on her/his bed for a certain predetermined time period. In the second condition example, a person has stayed in a certain predetermined area, for example, in a patient section or in an area around a bed for a certain predetermined time period. In the third condition example, a person has stayed in a room alone for a predetermined time period. These two first examples, the first and the second ones, are also possible to be used in situations, wherein there are more than one persons to be monitored in a single room. In the first condition example, the certain predetermined time may be arranged shorter than the certain predetermined time in the second condition example, whereas the certain predetermined time in the second condition example may be arranged shorter than the certain predetermined time in the third condition example. The certain predetermined time may be predetermined to be, in the first example, for example, 5-15 minutes, in the second example, for example, 15-45 minutes, and in the third example, for example, 30-90 minutes. But these times can be freely selected so they may be shorter or longer than these examples. It should be noted that there may be many more predetermined person to be monitored conditions, for example, using of a patient clothing or having an infusion pump etc. In other words, when it is detected and recognized from the image data, that a person uses a patient clothing or has an infusion pump, the person may be determined as a person to be monitored.

A person with a person to be monitored status i.e. a person with person to be monitored label i.e. a person to be monitored is configured to be monitored and imaged frequently. The image capturing frequency in a case of capturing stationary images wherefrom, for example, a person to be monitored is configured to be detected, may be, for example, 0.5-3 seconds, 1-2 seconds, or 1.5 seconds. In a case of video image data, the person to be monitored may be configured to be detected from the image data for example, in every 0.5-3 seconds, 1-2 seconds, or 1.5 seconds. In other words, the movements of the person to be monitored are analysed, for example, tracked and recognized, and the person to be monitored status may remain on person label i.e. the person remains as a person to be monitored, if the person to be monitored is visible all the time, person to be monitored leaves a main room to a second room or disappears in the front of second room and returns to main room alone and no other persons are detected during the visit to second room. The main room may be, for example, a patient or a customer room, and the second room may be, for example, a bathroom, toilet or any other room connected to main room and being different than a corridor.

Whereas a person to be monitored status of a person to be monitored may be lost if it is detected that another person overlaps too much with the person to be monitored, the person to be monitored exits a main room to a corridor (leaves from the main room), a person to be monitored is not detected by cameras for a certain predetermined time. A person to be monitored status, for example, a patient status may be kept alive for a longer time period than other statuses of person labels even though there are no detections of a person to be monitored in a monitored room i.e. the camera system has not captured image data of the person to be monitored for a certain time. If a person to be monitored loses her/his person to be monitored status, redetermining a person as a person to be monitored may be done similarly as determined above.

At least one alarm profile is attached to a person to be monitored label i.e. for a person to be monitored, for example, for a patient. The alarm profile comprises one or more attached activities of the person to be monitored i.e. events configured to trigger an alarm when corresponding activity is detected from image data by a computing device. The detecting of one or more activities comprises recognizing the one or more activities of the person to be monitored from image data. The recognized one or more activities are compared to one or more attached activities of the alarm profile and if they correspond, an alarm is triggered. A predetermined activity may be, for example, a fall, moving in a bed, leaving the bed, bed exit, sitting up from a wheelchair, toilet timer, room exit, or patient activity monitoring.

A fall alarm may be triggered and sent to personnel, for example, if it is detected from the image data that a person to be monitored, for example, a person with a patient status is sitting on the floor or laying on the floor in one, more than one, or multiple observations i.e. in one, more than one, or in multiple adjacent images or detections (checks). It may be predetermined that one or more additional fall checks need to be performed from image data before an alarm is triggered. Additional fall check may be, for example, one of the followings: no other person labels (than a patient) in the room (1 person room) or in patient section (multiple person room), the patient is not in chair, wheelchair or bed, or the patient is in a fall zone. If true, then an alarm is triggered. If not true i.e. there is another person label or labels (than the patient) in the room (1 person room) or in the patient section (multiple person room), the patient is in a chair, wheelchair or bed, or the patient is not in a fall zone, then an alarm is not triggered or sent. A fall zone may be an area where patient label has to be to generate a fall alarm, for example, a floor area in the middle of the room or corridor area. An alarm may also be triggered if activity class of a patient changes, for example, from standing to sitting or laying, or sitting to laying in the fall area.

A moving in bed alarm, leaving bed alarm, or bed exit alarm may be triggered and sent, for example, if it is detected from the image data that an activity class of a patient in her/his bed changes from laying to sitting, sitting to standing up, standing, or walking.

A sitting up from wheelchair alarm may be triggered, for example, if it is detected from the image data that a patient activity class in her/his wheel chair changes from sitting to standing up, standing, or walking.

A toilet alarm may be triggered, for example, if it is detected from the image data that a patient is alone in her/his room i.e. there are no other person labels in the room than the patient, and the patient moves alone to the second room or disappears in front of the second room, and does not arrive back to the main room within a certain predetermined time, for example in 5 to 15 minutes. The toilet alarm may be blocked i.e. not triggered, if the patient arrives within the certain predetermined time and/or another person (label) than the patient enters the main room or the second room.

A leaving a room alarm may be triggered, for example, if it is detected from the image data that there are not any other person labels than a patient or patients in a room and one or more patients leave from the main room to a corridor.

A patient activity monitoring alarm may be triggered, for example, if it is detected from the image data that a patient is recorded laying on bed or sitting in a wheel chair or chair over a predetermined time period, a patient has not moved at all during a predetermined time period, or if a patient is not in the room (day or night), or not in the bed during night time.

Thus, after a person is determined as a person to be monitored, the person to be monitored and her/his activities are recognized from the image data and alarms are triggered in cases when a recognized activity corresponds an activity of an alarm profile determined for the person to be monitored. Whereas, when a person to be monitored and her/his activities are analysed from the image data, an alarm is not triggered in a case where the detected activity does not correspond an activity of the alarm profile of the person to be monitored. In this case the activity was, for example, not attached to the alarm profile. The same thing happens, when a non-patient person, for example, a cleaning person, a member of the medical staff, a visitor or a person not having a status, is detected to perform an activity i.e. no alarm is performed, because no alarm profile is determined for her/him. For example, if leaving a room is an activity of an alarm profile of a patient, an alarm is performed, when the patient leaves the room, but not when a patient with an alarm profile not comprising leaving a room as an activity or a non-patient person leaves a room.

It is possible to configure i.e. adjust, control, or change settings of a camera or cameras configured to capture image data and a computing device configured to analyse the image data. It is possible, for example, to configure the settings of one or more in a camera of a monitoring system, by changing image capturing frequency of stationary images or poses, or in a case of video image data, the patient may be configured to be detected from the image data for analysis more frequently, for example, based on detected events. For example, if it is detected from the image data that a patient is getting up from a bed or falling, the image capturing settings of the camera may be configured by a data processing unit so that image capturing frequency of stationary images or poses increases, or image analysis settings may be configured so that a patient is configured to be detected in the video image data more often, so that a better idea of the state of the patient can be achieved. Further, it is possible, for example, to configure alarm profiles, for example, attach activities to the alarm profile or remove activities from the alarm profile, adjust time periods, for example, time periods defined to be used when determining a person as a person to be monitored.

FIG. 1 shows a view of a monitoring system according to an advantageous embodiment of the present disclosure in a space configured to be monitored, for example, a patient room or a bedroom. The monitoring system comprises at least one camera 10 comprising an image sensor 11. The camera 10 is configured to image i.e. capture real-time image data, which in this example is a real-time video stream, of one or more persons in the space. The camera 10 may be arranged, for example, in the ceiling of the space or to an upper part of the space or any other place wherefrom it is possible to image persons in the space.

The camera 10 comprises data transferring means, for example, a transmitter or a transceiver, for transmitting real-time video image data wirelessly or via wired connection from the camera 10 to a data processing unit 12. The data processing unit 12 comprises at least one processor, at least one memory including computer program code for one or more program units and means for receiving real-time video image data wirelessly or via wired connection from the camera 10, for example, a receiver or a transceiver. There may be multiple processors e.g. a general purpose processor, a graphics processor and/or a DSP processor and/or multiple different memories e.g. volatile memory for storing data and programs at run-time and non-volatile memory such as a hard disk for permanently storing data and programs. The data processing unit 12 may be any computing device suitable for analysing image data such as a computer. The data processing unit 12 may be in electronic communication with the camera 10 via signal lines. The data processing unit 12 may also include a video controller and an audio controller for generating signals that can be produced for the user with computer accessories. The data processing unit 12 may produce output to the user through output means. The video controller may be connected to a display (not shown). The display may be e.g. a flat panel display, a tablet, a display of a laptop or a projector for producing a larger image. The audio controller may be connected to a sound source, such as a loudspeakers, which, for example, produces alarming noise. The camera 10 may also include an acoustic sensor such as a microphone.

The data processing unit 12 is configured to receive real-time image data from the camera 10 and analyze it. The analyzing comprises at least detecting a person 15 from the image data and determining the detected person 15 as a person to be monitored, in this example, as a patient, because the data processing unit 12 detects from the image data that the person 15 has stayed on a bed 16 for a predetermined time period (a predetermined condition is fulfilled). The time period is predetermined for the data processing unit 12. The determining the person 15 as a patient comprises generating a label for the detected person 15 and setting a patient status for the label. After determining the person 15 as a patient the data processing unit 12 is further configured to track the patient from the image data and recognize one or more activities performed by the patient. The recognizing may be performed by using Artificial Intelligence (AI) model or models or any other suitable method. AI model or models used for recognizing activities of the patient 15 may be stored in the memory of the camera 10 or data processing unit 12. After the activity is recognized, it is compared to at least one activity attached to an alarm profile determined for the patient 15. If the recognized activity of the patient 15 corresponds to an activity attached to the alarm profile, an alarm is triggered and sent, for example, to a nurse call system. The alarm profile may comprise a selection of activities and by these activities it is defined whether a certain activity causes an alarm. Those selections of activities may be called as activities attached to the alarm profile.

It is possible that there are more than one camera in the space, which is a camera capturing stationary images or video image and/or the camera is capturing stationary images.

FIG. 2 shows a view of a monitoring system 20 according to an example embodiment in a space configured to be monitored. The space is in this embodiment a patient room of three people. The monitoring system 20 comprises three cameras 21a, 21b, 21c comprising an image sensor. The cameras 21a, 21b, 21c are configured to capture images at certain predetermined frequency of persons in the space. The first camera 21a is configured to capture images of the first person 23a, the second camera 21b is configured to capture images of the second person 23b, and the third camera 21c is configured to capture images of the third person 23c. The cameras 21a, 21b, 21c are arranged, for example, in the ceiling of the patient room or to an upper part of the patient room or any other place(s) in the patient room wherefrom it is possible to image persons 23a, 23b, 23c in the space.

The cameras 21a, 21b, 21c comprise data transferring means, for example, a transmitter or a transceiver, for transmitting image data wirelessly or via wired connection from the cameras 21a, 21b, 21c to a data processing unit 22. The data processing unit 22 may be, for example, a server. The data processing unit 22 comprises at least one processor, at least one memory including computer program code for one or more program units and means for receiving real-time video image data wirelessly or via wired connection from the cameras 21a, 21b, 21c, for example, a receiver or a transceiver. There may be multiple processors e.g. a general purpose processor, a graphics processor and/or a DSP processor and/or multiple different memories e.g. volatile memory for storing data and programs at run-time and non-volatile memory such as a hard disk for permanently storing data and programs. The data processing unit 22 may be any computing device suitable for analysing image and audio data such as a computer. The data processing unit 22 may be in electronic communication with the cameras 21a, 21b, 21c via signal lines. The data processing unit 22 may also include a video controller and an audio controller for generating signals that can be produced for the user with computer accessories. The data processing unit 22 may produce output to the user through its output means. The video controller may be connected to a display (not shown). The display may be e.g. a flat panel display, a display of a laptop or a projector for producing a larger image. The audio controller may be connected to a sound source, such as loudspeakers, for alarming. Physically the data processing unit 22 may locate in the hospital or outside the hospital. It is also possible that the cameras 21a, 21b, 21c transfer their data to a cloud storage, wherefrom the data processing unit 22 may retrieve or receive the data.

The data processing unit 22 is configured to receive image data substantially in real time from the cameras 21a, 21b, 21c or from the cloud storage, and to analyze their image data separately. The analyzing of image data of the first camera 21a comprises at least detecting a first person 23a from the image data and determining the detected person 23a as a person to be monitored, in this example, as a patient, because the data processing unit 22 detects from the image data of the first camera 21a that the person 23a has stayed on a bed 24a for a first predetermined time period (conditions for determining the person as a patient to be monitored are fulfilled). The first time period is predetermined for the data processing unit 22.

The analyzing of image data of the second camera 21b comprises at least detecting a second person 23b from the image data and determining the detected person 23b as a nonpatient i.e. a person not to be monitored, because the data processing unit 22 detects from the image data of the second camera 21b that the person 23b is not on a bed 24b of the second patient 23b or in a certain predetermined area 25b, in this example, in a patient section around the bed 24b of the second patient 23b (i.e. conditions for determining the person as a patient to be monitored are not fulfilled). The analyzing of image data of the third camera 21c comprises at least detecting a third person 23c from the image data and determining the detected person 23c as a patient, because the data processing unit 22 detects from the image data of the third camera 21c that the person 23c has stayed in a certain predetermined area 25c, in this example, in a patient section 25c around a bed 24c of the third patient 23c for a second predetermined time period (conditions for determining the person as a patient to be monitored are fulfilled). This time period is predetermined for the data processing unit 22 and it defines the time how long a person should stay in the patient section 25c in order to be determined as a patient.

Determining the persons 23a, 23c as patients comprises generating a label for the detected persons 23a, 23c and setting a patient status for the labels. After determining the persons 23a, 23c as patients the data processing unit 23a, 23c is further configured to track the patients 23a, 23c from the image data and recognize one or more activities performed by the patients 23a, 23c. The recognizing may again be performed by using Artificial Intelligence (AI) model or models or any other suitable method. AI model or models used for recognizing activities of the patients 23a, 23c may be stored in the memory of the camera 21a, 21c correspondingly. After the activity of a first patient 23a is recognized, it is compared to at least one activity attached to an alarm profile determined for the first patient 23a. If the recognized activity of the patient 23a corresponds to an activity attached to his/her alarm profile, an alarm is triggered and send, for example, to a nurse call system. After the activity of a third patient 23c is recognized, it is compared to at least one activity attached to an alarm profile determined for the third patient 23c. If the recognized activity of the patient 23c corresponds to an activity attached to his/her alarm profile, an alarm is triggered and sent. However, activities of the second person may also be recognized or it may be that the data processing unit 22 is configured so that it does not recognize activities of nonpatient persons. However, if the activity of a second person 23b is recognized, it may not be compared to any alarm profile, because an alarm profile is not determined for a person that is determined to be a nonpatient. And even an alarm profile is determined for a nonpatient person, there is usually no activity attached to that alarm profile.

Again the number of cameras capturing image data in real time can be different than the current three. There may be only one camera capturing stationary images or video image, which image data is then analysed by the data processing unit 22 so that persons can be detected and determined as patients, if conditions fulfil, and also activities of patients can be tracked and recognized so that alarms can be made, if needed.

Figures 3, 4:
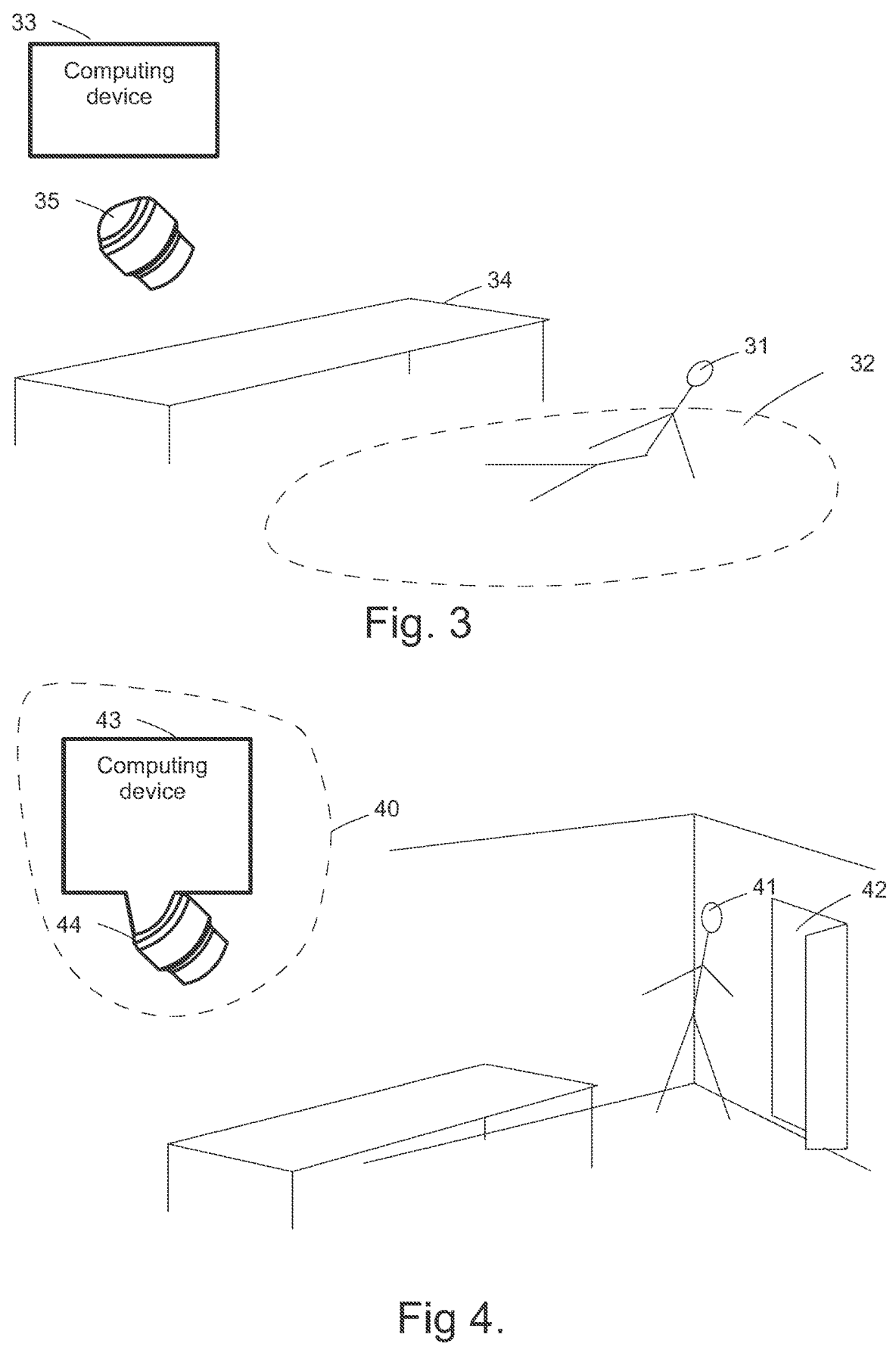

FIG. 3 shows a view of a situation of a patient 31 falling detected by a monitoring system 30 according to an example embodiment. In this example, the patient 31 is detected by a data processing unit 33 from image data captured by a camera 35 and determined as a patient as explained, for example, in context of FIGS. 1 and 2. After determining the person as a patient, the camera 35 has captured image data of the patient 31 and the data processing unit 33 has tracked of the patient 31 from the image data by detecting the patient from the images regularly and recognized activities of the patient 31 by AI models. There is an alarm profile determined for the patient 31 for which a falling is attached as one of the activities configured to cause an alarm. From the latest detection, the data processing unit 33 has recognized that activity of the patient 31 corresponds falling. Falling may be determined as sitting or laying on some other place than on a bed 34 or for example, a chair or wheelchair (not shown). The detected and recognized activity is compared to one or more activities attached to the alarm profile. And because the recognized activity (falling) of the patient 31 corresponds an activity attached to the alarm profile determined for the patient 31, an alarm is caused.

However, there may be certain predetermined condition(s) determined for the falling which needs to be fulfilled i.e. met for the alarm to be caused. It may be, for example, that it has to be detected from the image data that the patient 31 is in a fall zone 32. The fall zone 32 may be, for example, a floor area next to a bed 34 of the patient, or, for example, any other area of the room, except the bed 34, chair or wheelchair. Another predetermined condition may be, for example, that the patient 31 needs to be alone in the room when falling is detected so that an alarm would be caused. In other words, the data processing unit 33 is not able to detect any other person and/or patient in the room from the image data. But in a case of a room of more than one patient, for example, 2 or 3 patients, it is possible that the predetermined condition is that if there is in the room at least one other person determined as nonpatient person, an alarm will not be made.

FIG. 4 shows a view of a situation of a patient 41 leaving a hospital room unauthorized detected by a monitoring system 40 according to an example embodiment. In this example, a person is detected by a data processing unit 43 from image data captured by a camera 44 and the person is determined as the patient 41 as explained, for example, in context of FIGS. 1 and 2. After determining the person as a patient 41, the camera 44 has captured image data of the patient 41 and the data processing unit 43 has tracked the patient 41 from the image data by detecting the patient 41 from the images regularly and recognized activities of the patient 41 by AI models. There is an alarm profile determined for the patient 41 for which leaving a patient room unauthorized is attached as one of the activities configured to cause an alarm. From the latest detection, the data processing unit 43 is recognized that activity of the patient 41 corresponds leaving a patient room unauthorized. The unauthorized leaving may be determined to be as disappearing of a patient from the area in front of the room door 42 between two adjacent images or detections. The recognized activity is compared to attached activities of the alarm profile. And because the recognized activity (leaving a patient room unauthorized) of the patient 41 corresponds an activity attached to the alarm profile determined for the patient 41, an alarm is caused.

However, there may be certain predetermined condition(s) determined for leaving a patient room unauthorized which needs to be fulfilled that the alarm will be caused. It may be, for example, that the patient 41 needs to be alone in the room when leaving a patient room unauthorized is detected so that an alarm would be caused. In other words, the data processing unit 43 is not able to detect any other person and/or patient in the room from the image data. But in a case of a room of more than one patient, for example, 2 or 3 patients, it is possible that the predetermined condition is that if there is in the room at least one other person determined as nonpatient person, an alarm is not made.

Figure 5:
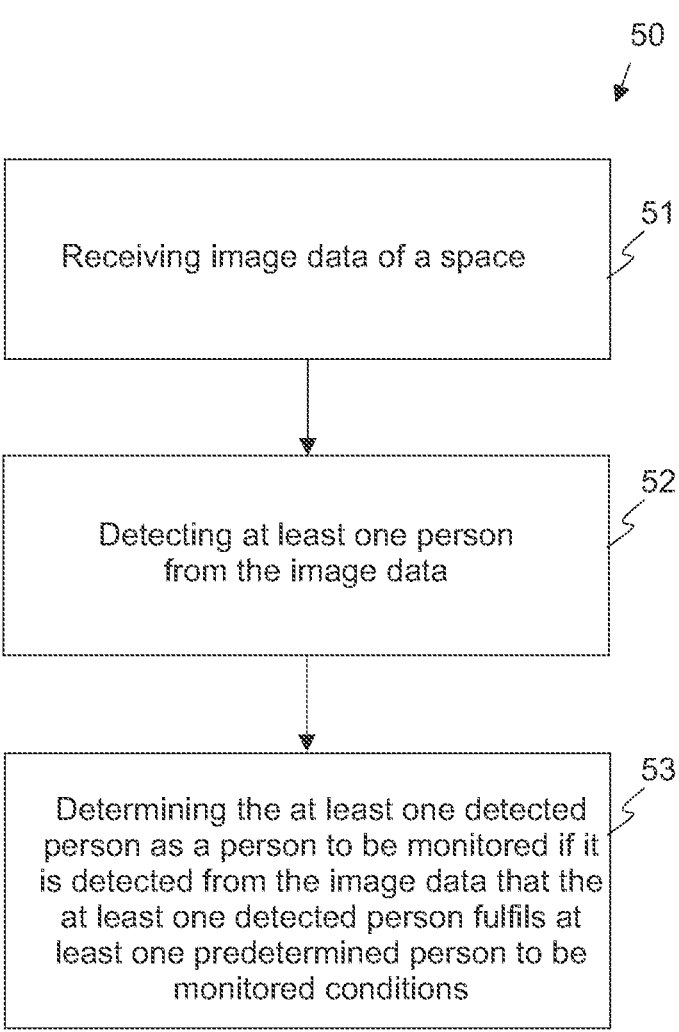
FIG. 5 shows a flow chart of a monitoring method according to an example embodiment.

FIG. 5 shows a flow chart of a computer implemented method 50 for monitoring at least one person in a space, the method 50 comprises the following. In step 51, image data of the space is received by a data processing unit i.e. a computing device. In step 52, at least one person is detected from the received image data and, in step 53, the at least one detected person is determined as a person to be monitored, if it is detected from the image data that the at least one detected person fulfils at least one predetermined person to be monitored conditions. The at least one predetermined person to be monitored conditions may comprise at least one of the following: a person has stayed on a bed for a first predetermined time period, a person has stayed in a predetermined area for a second predetermined time period, or a person has stayed alone in the space for a third predetermined time period. The method may further comprise one or more of the following steps: capturing image data of the space, tracking the person to be monitored from the image data and recognizing an activity of the person to be monitored, using Artificial Intelligence (AI) model or models for recognizing activity of the person to be monitored, comparing the recognized activity of the person to be monitored to at least one activity attached to an alarm profile determined for the person to be monitored and triggering an alarm if the detected event comprises an activity attached to the alarm profile, or blocking the alarm if another person is detected in the space. The determining the person as a person to be monitored may comprise: generating a label for the detected person and setting a person to be monitored status for the label. The activity attached to the alarm profile may be laying or sitting on a floor, leaving from the space. The person to be monitored may be a patient.

The data processing unit may be configured to receive image data of a space, detect at least one person from the image data and determine the at least one detected person as a person to be monitored, if it is detected from the image data that the at least one detected person fulfils at least one predetermined person to be monitored conditions and comprises at least one processor, at least one memory including computer program code for one or more program units and means for receiving image data wirelessly or via a wired connection from at least one camera. Means for receiving image data may be, for example, a receiver or a transceiver. An example of the data processing unit is defined more precisely above in context with the figures.

It will be obvious that the present disclosure is not limited solely to the above-presented embodiments, but it can be modified within the scope of the appended claims.

The invention claimed is:

1. A computer-implemented monitoring method of at least one person in a space, the method comprises:

receiving image data of the space from at least one camera configured to monitor the space, and detecting at least one person from the image data using a processor of a processing unit configured to receive the image data from the at least camera, wherein the method further comprises the processor being configured to:

determine the at least one detected person as a person to be monitored when the processor detects from the image data that the at least one detected person fulfils at least one predetermined condition, wherein the at least one predetermined condition comprises at least one of the following:

the at least one detected person has stayed on a bed for a first predetermined time period, or the at least one detected person has stayed alone in the space for a third predetermined time period, and when the at least one detected person does not fulfill any one of the at least one predetermined condition, determine the at least one detected person as a person not to be monitored.

2. The monitoring method according to claim 1, wherein determining the at least one detected person as the person to be monitored comprises:

generating a label for the at least one detected person, and setting a person to be monitored status for the label.

3. The monitoring method according to claim 1, wherein the method further comprises:

tracking the person to be monitored from the image data, and recognizing an activity of the person to be monitored.

4. The monitoring method according to claim 3, wherein the recognizing comprises:

using Artificial Intelligence (AI) model or models for recognizing the activity of the person to be monitored.

5. The monitoring method according to claim 3, wherein the method further comprises:

comparing the recognized activity of the person to be monitored to at least one activity attached to an alarm profile determined for the person to be monitored, and triggering an alarm if a detected event comprises an activity attached to the alarm profile.

6. The monitoring method according to claim 5, wherein the activity attached to the alarm profile is one or more of laying or sitting on a floor, leaving from the space or moving in a bed, or leaving the bed.

7. The monitoring method according to claim 5, wherein the method further comprises:

blocking the alarm if another person is detected in the space.

8. A monitoring system for monitoring at least one person in a space, the system comprising:

the at least one camera;

a computing device including the processing unit, the computing device configured to perform the method according to claim 1.

9. A non-transitory computer readable medium storing a computer program configured to be executed in a computing device, wherein the computer program product comprises instructions to perform the method according to claim 1.

\* \* \* \* \*